Jan. 8, 1952 M. DEMEULENAERE ET AL 2,581,393
COMPUTING DEVICE
Filed May 14, 1946 6 Sheets-Sheet 1
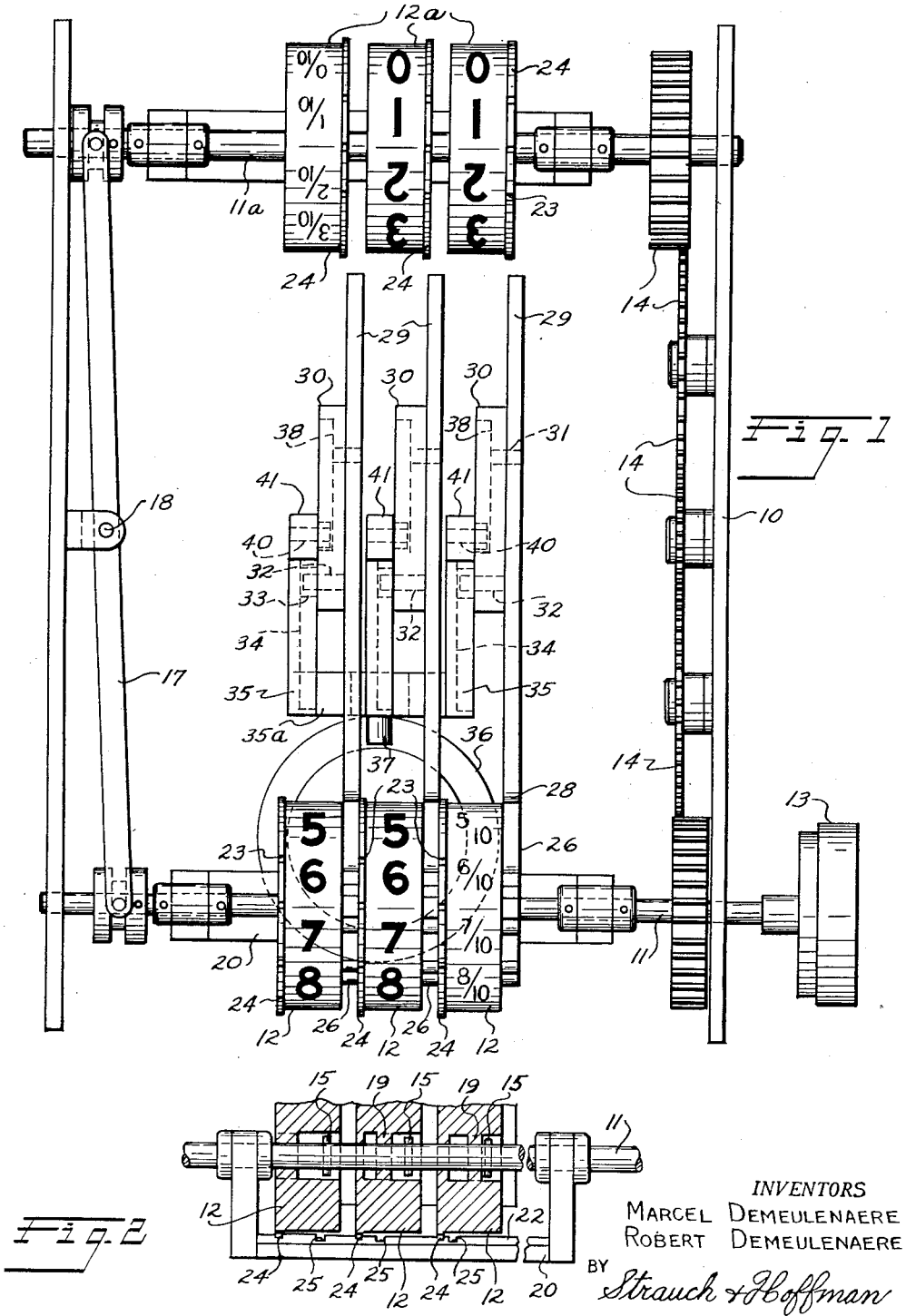
INVENTORS
MARCEL DEMEULENAERE
ROBERT DEMEULENAERE
BY Strauch + Hoffman
ATTORNEYS

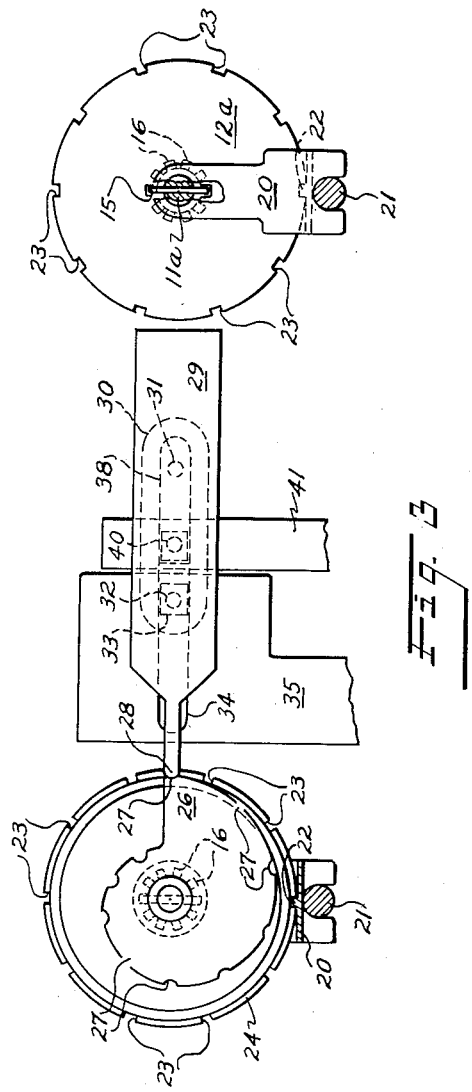

Patented Jan. 8, 1952

2,581,393

UNITED STATES PATENT OFFICE 2,581,393

COMPUTING DEVICE

Marcel Demeulenaere and Robert Demeulenaere,
New York, N. Y.

Application May 14, 1946, Serial No. 669,651

22 Claims. (Cl. 74—122)

This invention relates to computing devices to be used, for instance, in connection with liquid dispensing equipment for determining the cost of variable quantities of liquid delivered by the equipment at prices widely and frequently varying in value per unit of liquid volume.

The object of the invention is to simplify the construction and economize in the cost of manufacture of devices of this character as well as to improve the accuracy and precision of the computing functions thereof.

In the accompanying drawings:

Figure 1 is a top plan view showing the arrangement of the settable numeral wheels and their relation with the pump operated drive rods and related parts.

Figure 2 is a fragmentary sectional view through the numeral wheels of one set showing the driving and locking means associated therewith.

Figure 3 is a transverse sectional view of Figure 1 showing the numeral wheels and related parts.

Figure 4:
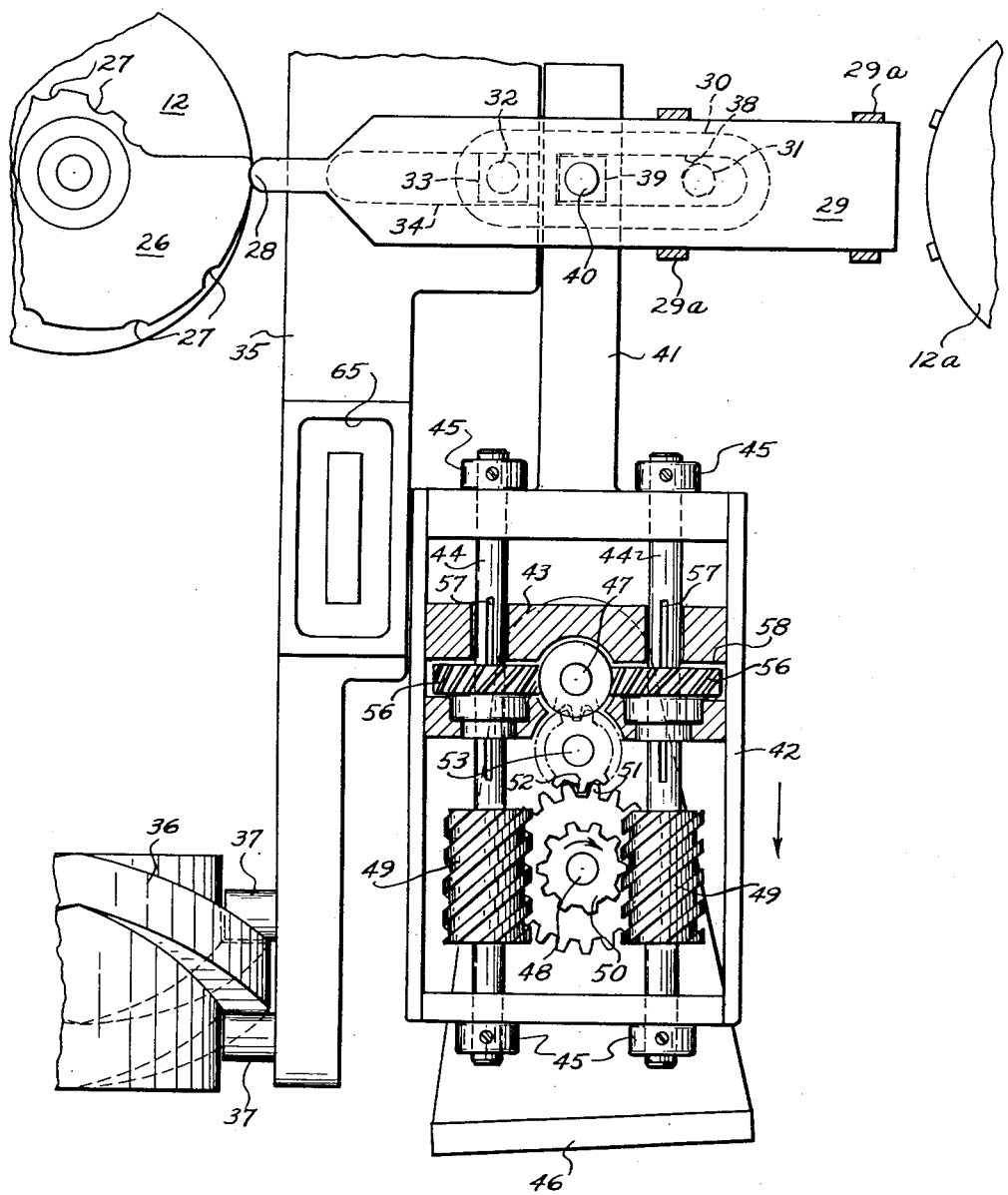
Figure 4 is a view similar to Figure 3 on an enlarged scale showing the computing shaft and actuators therefor together with related parts of the computing device.

Referring to the drawing in detail, 10 indicates a part of the casing of the machine rotatably and slidably supporting a pair of parallel setting shafts 11 and 11a for use in turning and setting up values on separate sets of numeral wheels 12 and 12a in accordance with the prevailing price of gasoline or other liquid, the cost of which is to be computed. The wheels 12 and 12a are held against axial movement. The shaft 11 is provided with a manually operable set knob 13 and the rotary motion thereof is transmitted to the other shaft 11a by a gear train 14.

The numeral wheels of each set are adjusted in succession beginning with the one of lowest denomination by drive pins 15 one of which is provided for each wheel and is engageable in any one of ten keyways 16 (Figure 3) provided internally of the numeral wheels. In the position shown in Figure 2, the shaft 11 is moved axially to the right to the limit of its movement and the several pins are disengaged from the related wheels. The corresponding drive pins on the other shaft 11a are likewise disengaged from the related wheels 12a by axial motion transmitted to the shaft 11a through a lever 17 pivotally mounted at 18. The keyways 16 of all except the value wheels of the highest denomination are formed in internal flanges 19 of approximately the same width as the length of each axial stepwise movement of the setting shaft. The keyways in the numeral wheels of highest denomination are formed directly in the bodies of said wheels. The flanges 19 and the portion of the value wheel of highest denomination having the keyways formed therein are so progressively spaced with respect to the position of the related pins 15 that a driving connection between the setting shaft and the wheels of the related set is successively established during stepwise axial displacement of the setting shaft and in this manner the several wheels may be successively set to display the selected numerals in the window behind which the numeral wheels are located in the usual manner.

A locking yoke 20 is supported by and movable axially with each shaft 11 and 11a but is held against rotation by a guide rod 21. The rib 22 of the yoke is normally engaged in one each of the ten recesses 23 formed in the external flanges 24 of each set of numeral wheels whereby the latter are locked in adjusted position after being set. Recesses 25 are formed in the rib 22 and are so arranged with respect to the driving pins 15 that as the latter enter the keyways 16 during the progressive stepwise movement of the setting shaft, the flange 24 enters the related recess 23 and the numeral wheel which is keyed to the setting shaft may be freely turned. When the shaft 11 is moved axially to the position shown in Figure 2 and the shaft 11a is moved to a corresponding position by the lever 17, the several numeral wheels of both sets are locked in adjusted position.

A spiral cam 26 (Figures 3 and 4) having ten peripheral notches 27 at equal angular intervals is fixed to each numeral wheel 12 and the rounded extremity 28 of a related spring pressed slide bar 29 is normally engaged in one of the notches. The bars 29 are prevented from moving in any direction other than longitudinally by guides 29a. The contour of the cams 26 is such that at each angular movement imparted thereto by partial rotation of the knob 13 the slide bars 29 are moved longitudinally a predetermined distance. A lever 30 is mounted at one end to swing about a pivot pin 31 fixed on the slide bar and the opposite end of the lever carries fixed thereto a pivot pin 32 the protruding end of which pivotally carries a block 33 slidable with the bar 29 horizontally in a guide way 34 provided in one of a group of vertically movable drive rods 35. The rods 35 associated with the several slide bars 29 are moved together as a unit by a connecting member 35a (Figure 1).

The pump or other instrument (not shown) employed for delivering the fluid the cost of which is to be computed is directly coupled with and drives a cam 36 at a rate precisely proportional to the rate of delivery of the fluid. Rollers 37 on the drive rod assembly 35 are engaged with the cam 36 and consequently the drive rods are reciprocated vertically a fixed distance at a frequency proportional to the rate of rotation of the pump operated cam 36. The pivot pins 32 transmit the movement of the drive rods 35 to the levers 30 which latter are thus swung back and forth through a fixed angle about the pivots 31 during the period of operation of the pump.

Figure 5:
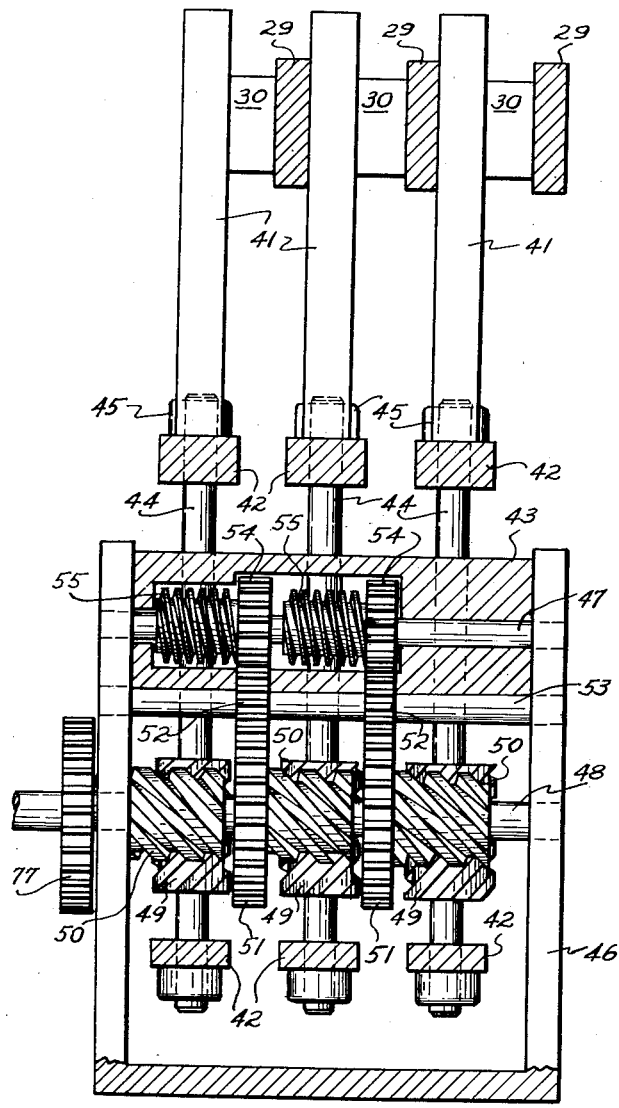
Figure 5 is a vertical sectional view through Figure 4.

Each lever 30 is formed with a slot 38 extending from adjacent the pivot pin 32 toward and beyond the pivot pin 31 in which slot is slidably mounted a slide block 39 pivotally mounted upon a coupling pin 40 fixed to and protruding from a shank 41 of one of three open rectangular frames 42 (Figs. 4 and 5). The swinging movement of the levers 30 is thus transmitted to the frames 42, the vertical reciprocating motion of which is guided at least in part by a support 43 passing horizontally through the openings in the several frames.

It will be noted however, that the amplitude of the reciprocating movement of the frames varies in dependence upon the adjustments of the slide bars 29 and the position of the coupling pins 40 with relation to the pivot pins 31. It is also evident that when the slide bars 29 are shifted to a position in which the pivot pins 31 coincide with the coupling pins 40, the levers 30 are rendered ineffective to impart movement to the frames 42 and the latter consequently remains stationery.

A pair of vertical parallel shafts 44 is journalled in the top and bottom members of each frame 42 and being rotatably and slidably mounted in the support 43 assist in guiding the movement of said frame. Axial movement of the shafts 44 is prevented by collars 45 secured thereto. The opposite side members of a rigid U-shaped rocking frame 46 are pivotally suspended from the extremities of a shaft 47 rotatable in the support 43 and a shaft 48 is journalled in the side members of the frame 46 and passes centrally between the shafts 44 of each frame 42. Actuators 49 in the form of axially elongated gear wheels with helical teeth are fixedly secured to the shafts 44 and during rocking motion of the frame 46, pinions 50 mounted on the shaft 48 are alternately moved into mesh with the actuators 49 at opposite sides of the shaft 48.

Each pair of actuators 49 in a frame 42 constitutes a combined rack and worm drive operative during vertical reciprocation of the frame 42 and rocking motion of the frame 46 to alternately engage the related pinion 50 and impart a unidirectional rotary movement thereto.

In Figure 4 for instance during the downward movement of the frame 42, the right hand actuator 49 is engaged with the pinion 50 and the latter is rotated in the direction of the arrow. When the frame 42 reaches the lower limit of its movement, the frame 46 is rocked to the left by means to be hereinafter more fully described and the left hand actuator 49 is brought into mesh with the pinion 50 so that the motion of the pinion in the same direction is continued. The distance between the actuators 49 in one open frame 42 is so related to the diameter of their cooperating pinion 50 that when the frame 46 is rocked from one extreme position to the other the pinion will commence to mesh with the helical teeth on the actuator towards which it is moving, before it becomes disengaged from the helical teeth on the actuator that it is leaving, so that there is no time that it is disengaged from both actuators. When during vertical reciprocation of the frame 42 and actuators 49, rotary movement in the proper direction is imparted to the actuators, the worm action of the helical actuator teeth causes the related pinion 50 to revolve at a higher rate of speed than that produced by the purely rectilinear motion of the actuators when they are held against rotation in a manner to be described.

All of the pinions 50 except the one associated through the related actuators 49, frame 42 and lever 30 with the numeral wheel 12 of highest denomination are rotatably mounted on the shaft 48 while the pinion 50 of highest denomination is rigidly secured to the shaft 48. The pinions 50 of low and intermediate denomination are fixed to gear wheels 51 meshing with gear wheels 52 rotatably mounted on an intermediate shaft 53 journalled in the frame 46. The gear wheels 52 are in mesh with gear wheels 54 rotatably mounted on the shaft 47 in recesses provided in the support 43.

Each of the gear wheels 54 is integral with a worm 55 meshing with opposed worm wheels 56 slidably mounted in keyways 57 in the adjacent shafts 44. The worm wheels 56 are confined in recesses 58 in the support 43 and are thus held against axial movement during vertical reciprocation of the frame 42. As shown in Figure 5, the shafts 44 associated with the numeral wheel of lowest denomination are devoid of the worm wheels 56 and such wheels are applied only to the shafts 44 associated with the numeral wheels of intermediate and highest denomination. Also as will be understood, the ratio of the gear wheels 51, 52 and 54 and the worm wheels 56 and worms 55 is so chosen that during the time that the pinion 50 of any denominational value makes one revolution the actuators 49 of the next denominational value are turned sufficiently (through pinion 51, gears 52, 53 and 54, worm 55 and worm wheel 56) to cause the related pinion 50 to advance through an angle corresponding with the distance between two of its 20 teeth or one tenth of a revolution beyond the position determined by the motion imparted thereto by virtue of the purely reciprocatory rack action of the related actuators 49. Thus a continuously operating carry-over is provided, rather than one that acts upon the next denomination only at the end of a complete revolution.

Figure 6:
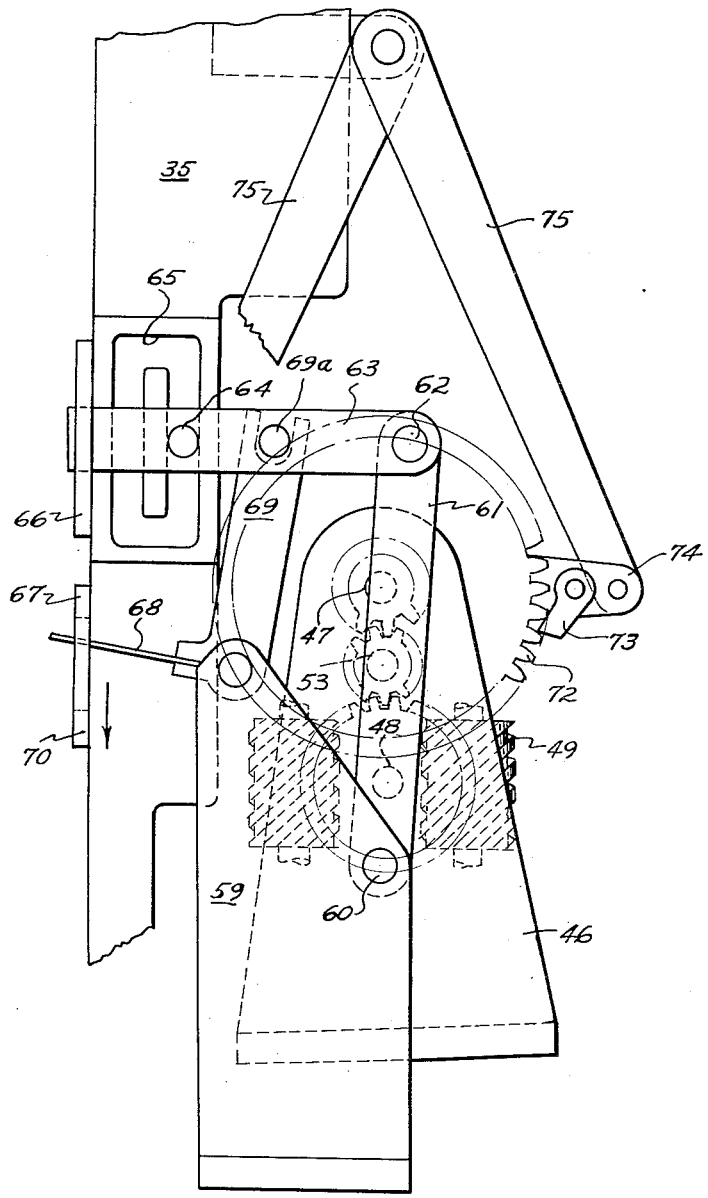
Figure 6 is a detail illustrating the mechanism for shifting the rocking frame.

The rocking frame 46 is shifted from side to side to alternately engage the pinions 50 with the actuators 49 in properly timed relation to the motion of the drive rods 35 by the mechanism shown in Figure 6 and consisting of a fixed bracket 59 provided with a pivot 60 supporting a lever 61 in which one end of the shaft 43 is engaged. The upper extremity of the lever 61 is pivotally connected at 62 with a link 63 provided with a laterally projecting pin 64 engaged in an open rectangular slot 65 provided in one of the drive rods 35. In the position shown in Figure 6, the frame 46 is rocked about the shaft 47 to the right and is held in this position by the pin 64 engaging in the right hand portion of the rectangular slot 65, the end of the link 63 opposite the pivot 62 being movable in a stationary guide 66. As the drive rod 35 approaches the lower limit of its movement an abutment 67 thereon engages a spring 68 forming part of a lever 69 so that the latter is urged toward the left. The upper end of the lever 69 has an open slot which engages a pin 69a fixed to the lever 63. When the pin 64 enters the upper open portion of the slot 65 it is free to move to the left and under the influence of the spring 68 the lever 69, and pin 69a, the link 63 and lever 61 are shifted to the left together with the frame 46, which is rotated about its pivotal mounting upon the shaft 47. During the succeeding up stroke of the drive rod 35, the pin 64 is maintained in the left hand portion of the slot 65 and near the upper limit of the movement of the rod 35 a second abutment 70 thereon engages and flexes the spring 68 so that a force is applied to the lever 69, which when the pin 64 moves into the lower open portion of the slot 65, shifts the link 63, lever 61 and frame 46 back to the right hand position.

Figure 7:
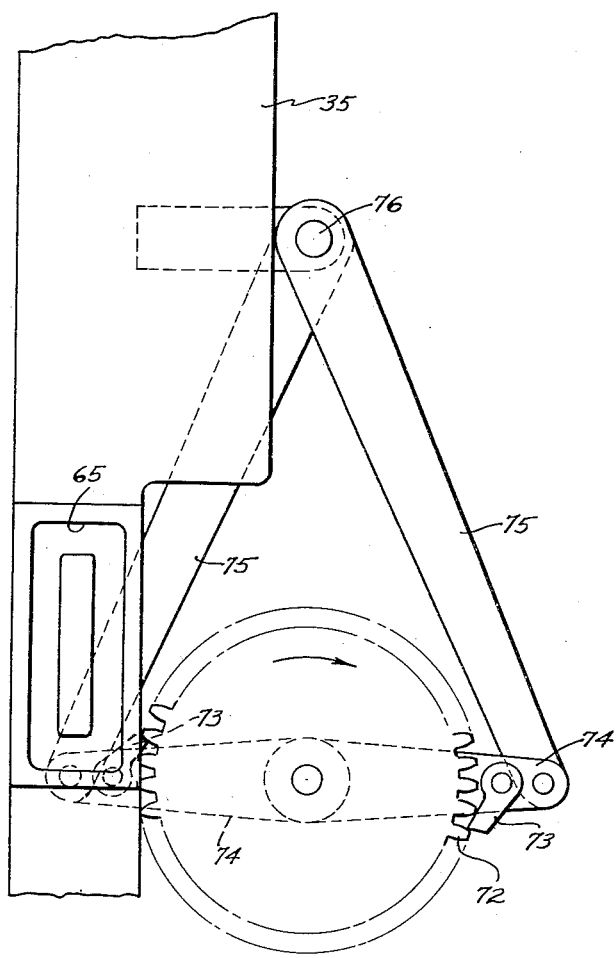
Figure 7 is a detail view of the drive means for the operations counter.

A wheel connected with a suitable counting mechanism (not shown) for registering the number of reciprocations of the drive rods 35 and consequently the out-put of the pump may be operated by a gear wheel 72 (Fig. 7) coacting with oppositely arranged pawls 73 mounted on swinging arms 74 and connected by links 75 with a pin 76 on one of the drive rods.

As stated, the pinion 50 of the highest denominational value of the computing device is fixed to the shaft 48 and a gear wheel 77 also fixed to said shaft is connected with a preferred type of counting mechanism (not shown) which translates the aggregate of the rotary movement of the shaft into a value corresponding with the total cost of the units of volume of fluid delivered by the pump at the price per unit which is set up on the numeral wheels 12 and 12a.

In use, the numeral wheels 12 and 12a are set as above described by the knob 13 in positions to indicate the prevailing unit cost of the fluid and to dispense a selected quantity of fluid the pump is set in operation by the usual control means. If any of the numeral wheels is set in the zero position, the setting cam 26 is so adjusted that the slide bar 29 brings the pivot pin 31 into exact coincidence with the coupling pin 40 and consequently the related frame 42 remains stationary during oscillation of the lever 30 by the drive rod 35.

The actuators 49 of the stationary frame, may however be rotated while remaining in fixed axial position by the related worm 55 driven by the pinion 50 of the next lower denomination through the gear wheels 51, 52 and 54 and the worm wheels 56 so that in the operation of the computing device the continuity of transmission of motion from the lowest to the highest order pinion 50 is maintained in the proper ratio. When any one of the numeral wheels is moved from the zero position into other positions successively registering the values 1 to 9, the cam 26 is progressively turned into different angular positions in which the slide bar 29 is shifted longitudinally and the pivot pin 31 is moved step by step to the right (Figure 4) greater distances from the coupling pin 40. The levers 30 are constantly oscillated through a fixed angle during the operation of the pump by the cam 36 and rods 35 but the amplitude or stroke of the vertical reciprocation of the frames 42 depends upon the position of the coupling pin 40 with respect to the pivot pin 31 which as will be understood, is determined by the value set up on the numeral wheels. During the reciprocating movement of the frames 42 the alternately effective actuators 49 moving therewith revolve the related pinions 50 in degree proportional to the setting of the levers 30. In addition to the rotary movement thus imparted to the pinions 50 directly by the rack action of the related actuators, the pinions, with the exception of the pinion related to the numeral wheel of the lowest denominational order, are additionally rotated by the worm drive action of the helical teeth of the actuators upon the pinions resulting from the rotary motion imparted to the actuators by the pinion of next lower order through the gear wheels 51, 52 and 54, worm 55 and worm wheels 56. The actuators 49 coacting with the pinion 50 of the highest order thus rotate the latter pinion as well as the shaft 48 in degree proportional to the sum of the linear and angular movements of the several actuators and through the gear wheel 77 the counter (not shown) is actuated and registers the cost of the total number of integral and fractional units of volume of fluid delivered during the period of operation of the pump. The counter (not shown) connected with the gear wheel 72 indicates the number of integral and fractional units of volume of liquid dispensed.

The worms 55 and worm wheels 56 constitute a non-reversible drive in the sense that rotary motion of the worms 55 may be imparted to the actuator shafts 44 but the worms prevent such rotary motion of the actuator shafts as tends to occur during the rack drive action of the actuators due to the helical pitch of the teeth.

What we claim is:

1. In a computing device, a quantitative responsive device, a computing shaft, toothed pinions on said shaft, actuators having teeth operable during axial movement of the actuators to impart rotary motion to the pinions by rack drive action and operable during rotary movement to impart further rotary motion to the pinions by worm drive action, settable drive means for imparting selectively variable axial rack drive movements to said actuators in accordance with selectable variable factors, means for actuating said drive means in proportional accordance with the output of said quantitative responsive device, and means operable by certain of the pinions rotated by axial movement of the related actuators for imparting rotary worm drive movement to the actuator related to one of the adjacent pinions.

2. A computing device as claimed in claim 1 wherein the actuators are arranged in pairs one on each side of each pinion, said settable drive means actuating a reciprocable frame rotatably supporting said actuators.

3. A computing device as claimed in claim 1 wherein the actuators are arranged in pairs one on each side of each pinion, and alternately moved into engagement therewith during axial movement of the actuators.

4. A computing device as claimed in claim 1 wherein the means operable by the rotating pinions is constituted in part by a worm and worm wheel.

5. In a computing device, numeral wheels, a computing shaft, helically toothed pinions on said shaft each associated with one of said numeral wheels, helically toothed actuators engageable by the pinions and movable axially to impart rotary movement to said pinions, means for moving each actuator axially in degree proportionally to the value set up on the related numeral wheel, means operable by certain of the rotating pinions for imparting rotary motion to the actuator related to one of the adjacent pinions, the helical form of the teeth of the pinions and the actuators thereby further rotating said adjacent pinions, a quantitative responsive device, and means operative to move said actuators axially in accordance with the output of said quantitative responsive device.

6. A computing device as claimed in claim 5 wherein said actuators are arranged in pairs one on each side of each pinion, and means to move the computing shaft to cause the pinions to alternately mesh with the toothed actuators related thereto.

7. A computing device as claimed in claim 5 wherein said pinion operated means is constituted at least in part by a non-reversible worm drive gear.

8. A computing device as claimed in claim 5 provided with a frame rotatably supporting the computing shaft and shiftable to move the pinions into and out of mesh with the toothed actuators.

9. A computing device as claimed in claim 5 provided with a frame rotatably supporting the computing shaft and shiftable to move the pinions into and out of mesh with the toothed actuators, and means operated in timed relation to the axial movement of actuators to shift said frame.

10. A computing device as claimed in claim 5 wherein said actuators are arranged in pairs one on each side of each pinion, and means for moving the computing shaft in timed relation to the axial movement of the actuators to cause the pinions to alternately mesh with the toothed actuators related thereto.

11. In a variable ratio differential gearing structure, supporting members movable angularly with relation to each other, a shaft mounted in one of said members, toothed actuators rotatable in the other supporting member and movable axially therewith, pinions mounted on said shaft and movable with the first mentioned supporting member into mesh with the toothed actuators whereupon rotary motion is imparted to the pinions during axial movement of the actuators, and means partly including the actuators and operated by each of certain of the pinions rotated by the related actuator for imparting additional rotary motion to one of the adjacent pinions.

12. In a variable ratio differential gearing structure, variably settable members, an actuator related to each member, means for moving each actuator axially in degree proportional to the setting of the related setting member, means for moving said actuators angularly, and means responsive to the movements of said actuator and movable in degree proportional to the sum of the axial and angular movements of the actuators.

13. In a computing device, a quantitative responsive device, a computing shaft, reciprocable drive means for said shaft actuated by said last mentioned device, an actuating lever pivotally and slidably connected with the drive means, a shiftable member, and a fulcrum pin pivotally connecting said lever with the shiftable member and displaceable with the shiftable member for moving the fulcrum pin from a position coinciding with the pivotal connection of the lever and drive means into various positions spaced therefrom.

14. In a computing device, a quantitative responsive device, a computing shaft, reciprocable drive means for said shaft actuated by said last mentioned device, an actuating lever pivotally and slidably connected with the drive means, a shiftable member, a fulcrum pin pivotally connecting said lever with the shiftable member and displaceable with the shiftable member for moving the fulcrum pin from a position coinciding with the pivotal connection of the lever and drive means into various positions spaced therefrom, and means for oscillating said lever through a fixed angle.

15. In a computing device, rotary drive means responsive to a quantitative input, a computing shaft, reciprocable drive means for said shaft actuated by said rotary drive means, an actuating lever pivotally and slidably connected with the reciprocable drive means, a shiftable member, a fulcrum pin pivotally connecting said lever with the shiftable member and displaceable with the shiftable member for moving the fulcrum pin from a position coinciding with the pivotal connection of the lever and reciprocable drive means into various positions spaced therefrom, a numeral wheel, and a cam actuated by the numeral wheel for moving the shiftable member in degree proportional to the angular movement of the numeral wheel.

16. In a computing device, rotary drive means responsive to a quantitative input, a computing shaft, reciprocable drive means for said shaft actuated by said rotary drive means, an actuating lever pivotally and slidably connected with the reciprocable drive means, a shiftable member, a fulcrum pin pivotally connecting said lever with the shiftable member and displaceable with the shiftable member for moving the fulcrum pin from a position coinciding with the pivotal connection of the lever and reciprocable drive means into various positions spaced therefrom, means for oscillating said lever through a fixed angle, a numeral wheel, and a cam actuated by the numeral wheel for moving the shiftable member in degree proportional to the angular movement of the numeral wheel.

17. In a computing machine, a quantitative responsive device, a computing shaft, a plurality of actuating means for said shaft controlled by said quantitative responsive device, a numeral wheel associated with each actuating means, means for rendering the actuating means variably effective in dependence upon the setting of the numeral wheels, an adjusting shaft supporting said wheels and mounted for rotary and axial stepwise movement, means operative in different axial positions of the adjusting shaft for establishing a driving connection with the wheels, means to lock said wheels against rotation, and means to render the locking means ineffective with respect to the wheel in driving connection with the adjusting shaft.

18. A computing machine as claimed in claim 17 provided with an additional adjusting shaft and numeral wheels driven by the additional shaft in different axial positions thereof, and means for transmitting the axial and rotary movements of the first to the second mentioned adjusting shafts.

19. In a computing device, numeral wheels; a computing shaft; helically toothed pinions on said shaft each associated with one of said numeral wheels; helically toothed actuators arranged in pairs one on each side of each pinion, engageable by said pinions and movable axially to impart rotary movement to said pinions; quantitative responsive drive means; means connected to said drive means and operative to move said actuators axially first in one direction and then in the other direction in accordance with the output of said drive means; means for controlling the axial movement of each pair of actuators proportionately to the value set up on the related number wheel; means operable by certain of the rotating pinions for continuously imparting rotary motion to the actuators related to one of the adjacent pinions, the helical form of the teeth of the pinions and the actuators thereby further continuously rotating said adjacent pinions; and means to move the computing shaft to cause each of the pinions to alternately mesh with one or the other of its associated pair of actuators, each of said pinions and its associated pair of actuators being arranged so that the pinion is always in engagement with at least one of its associated actuators.

20. In a computing mechanism, a quantitative responsive device, a computing shaft, a toothed pinion mounted on said shaft, a reciprocable actuator having teeth engageable with the teeth of said pinion and operable during reciprocation of said actuator in either direction to impart unidirectional rotation to said pinion by rack drive action, settable drive means for imparting selectively variable reciprocative movements to said actuator in accordance with selectable variable factors, and means for actuating said drive means in proportional accordance with the output of said quantitative responsive device.

21. A computing mechanism in accordance with claim 20 wherein the teeth on said actuator include a first set effective to engage one side of said pinion during movement of said actuator in one direction, and a second set effective to engage the other side of said pinion during movement of said actuator in the other direction.

22. In a computing mechanism, a quantitative responsive device, a computing shaft, toothed pinions rotatable on said shaft, reciprocable actuators cooperating separately with said pinions, each having teeth operable during reciprocation of said actuators in either direction to impart unidirectional rotation to said pinions by rack drive action, settable drive means for imparting selectively variable reciprocative movements to each of said actuators in accordance with selectable variable factors; means for actuating said drive means in proportional accordance with the output of said quantitative responsive device, and means driven by one of said pinions and connected to impart an additional rotation to the other of said pinions in proportion to the degree of rotation of said one pinion.

MARCEL DEMEULENAERE.
ROBERT DEMEULENAERE.

REFERENCES CITED

The following references are of record in the file of this patent:

UNITED STATES PATENTS

| Number | Name | Date |
|---|---|---|
| 668,172 | Fischer et al. | Feb. 19, 1901 |
| 1,237,910 | Jackson | Aug. 21, 1917 |
| 2,078,822 | Walker | Apr. 27, 1937 |
| 2,237,108 | Nichols | Apr. 1, 1941 |
| 2,278,983 | Fuller | Apr. 7, 1942 |